(12) United States Patent
Campero et al.

(10) Patent No.: US 8,736,423 B2
(45) Date of Patent: *May 27, 2014

(54) RFID NETWORK CONTROL AND REDUNDANCY

(75) Inventors: Richard John Campero, San Clemente, CA (US); Steven James Raynesford, Laguna Hills, CA (US); Craig Evan Trivelpiece, Las Vegas, NV (US); Steve Edward Trivelpiece, Irvine, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 245 days.

This patent is subject to a terminal disclaimer.

(21) Appl. No.: 13/359,628

(22) Filed: Jan. 27, 2012

(65) Prior Publication Data

US 2012/0139709 A1    Jun. 7, 2012

Related U.S. Application Data

(63) Continuation of application No. 12/341,894, filed on Dec. 22, 2008, now Pat. No. 8,138,891, and a continuation-in-part of application No. 11/370,530, filed on Mar. 7, 2006, now Pat. No. 8,497,762.

(60) Provisional application No. 61/016,413, filed on Dec. 21, 2007.

(51) Int. Cl.
*G06K 7/08* (2006.01)

(52) U.S. Cl.
USPC .................... 340/10.1; 343/893; 370/351

(58) Field of Classification Search
None
See application file for complete search history.

(56) References Cited

U.S. PATENT DOCUMENTS

2003/0174099 A1*  9/2003  Bauer et al. ............... 343/893

* cited by examiner

*Primary Examiner* — Nabil Syed
*Assistant Examiner* — Cal Eustaquio
(74) *Attorney, Agent, or Firm* — Rick Comoglio

(57) ABSTRACT

In accordance with embodiments of the invention, RFID network control devices (RNCDs) are provided wherein RFID traffic signals from any one of multiple RFID readers may be routed to any of the RFID antennas coupled to the RNCD. Each reader coupled directly or indirectly to the RNCD, either through its own action or the action of the external host controller managing the reader, may issue commands to the RNCD, over the same cable used to carry RFID traffic signals, and cause the RNCD to set its internal switch configuration such that a channel is established for RFID traffic signals between that reader and a particular RFID antenna coupled to the RNCD. This may include commands from the reader or external host controller which place other intervening RNCD units in a bypass state so as to establish the required communications channel with a minimum of signal strength loss.

19 Claims, 11 Drawing Sheets

RFID NETWORK CONTROL AND REDUNDANCY

RELATED APPLICATIONS

This application is a continuation of U.S. Non-provisional patent application Ser. No. 12/341,894, filed Dec. 22, 2008, entitled "RFID Network Control and Redundancy", which is a non-provisional U.S. Provisional Application No. 61/016,413, filed Dec. 21, 2007, entitled "RFID Network Control and Redundancy," and is a continuation-in-part of U.S. patent application Ser. No. 11/370,530, filed Mar. 7, 2006, for "Network Control", which applications are also expressly incorporated herein by reference in their entirety.

FIELD OF THE INVENTIONS

The present inventions relate generally to an RFID network control device (RNCD) or module of utility in directing or routing radio frequency signals from an RFID reader or other host device or computer over a network of antennas and other devices requiring communication with the RFID reader, a collection of readers, and/or host computers. The inventions are of particular use in RFID applications having a large number of antennas and/or other peripheral devices in which it is desirable to minimize the number of relatively expensive readers and/or hosts. This includes but is not limited to RFID smart shelving and other smart or RFID enabled retail fixture systems. The signals carried and directed by the routing device of the embodiments described herein may be RFID commands for communication between RFID readers and tags, or those signals may be control signals used to set switches, power on or off devices on the network, identify and/or configure devices on the network, or carry out other functions necessary to the effective operation of the RFID network.

BACKGROUND

Radio frequency identification (RFID) systems and other forms of electronic article surveillance are increasingly used to track items whose locations or dispositions are of some economic, safety, or other interest. In these applications, typically, transponders or tags are attached to or placed inside the items to be tracked, and these transponders or tags are in at least intermittent communication with transceivers or readers which report the tag (and, by inference, item) location to people or software applications via a network to which the readers are directly or indirectly attached. Examples of RFID applications include tracking of retail items being offered for public sale within a store, inventory management of those items within the store backroom, on store shelving fixtures, displays, counters, cases, cabinets, closets, or other fixtures, and tracking of items to and through the point of sale and store exits. Item tracking applications also exist which involve warehouses, distribution centers, trucks, vans, shipping containers, and other points of storage or conveyance of items as they move through the retail supply chain. Another area of application of RFID technology involves asset tracking in which valuable items (not necessarily for sale to the public) are tracked in an environment to prevent theft, loss, or misplacement, or to maintain the integrity of the chain of custody of the asset. These applications of RFID technology are given by way of example only, and it should be understood that many other applications of the technology exist.

In the case of passive RFID systems, the RFID tag is powered by the electromagnetic carrier wave. Once powered, the passive tag interprets the radio frequency (RF) signals and provides an appropriate response, usually by creating a timed, intermittent disturbance in the electromagnetic carrier wave. These disturbances, which encode the tag response, are sensed by the reader through the reader's antenna. In the case of active RFID systems the tag contains its own power source, such as a battery, which it can use to either initiate RF communications with the reader by creating its own carrier wave and encoded RF signals, or else the tag power can be used to enhance the tag performance by increasing the tag's data processing rate or by increasing the power in the tag's response, and hence the maximum distance of communication between the tag and reader.

RFID systems typically use reader antennas to emit electromagnetic carrier waves encoded with digital signals to RFID tags. As such, the reader antenna is a critical component facilitating the communication between tag and reader, and influencing the quality of that communication. A reader antenna can be thought of as a transducer which converts signal-laden alternating electrical current from the reader into signal-laden oscillating electromagnetic fields or waves appropriate for a second antenna located in the tag, or alternatively, converts signal-laden oscillating electromagnetic fields or waves (sent from or modified by the tag) into signal-laden alternating electric current for demodulation by and communication with the reader. Types of antennas used in RFID systems include patch antennas, slot antennas, dipole antennas, loop antennas, and many other types and variations of these types.

The detection range of passive RFID systems is typically limited by signal strength over short ranges, for example, frequently less than a few feet for passive UHF RFID systems. Due to this read range limitation in passive UHF RFID systems, many applications make use of portable reader units or mobile carts with readers and antenna wands tethered to the readers with cables. These portable or mobile reader systems may be manually moved around a group of tagged items in order to detect all the tags, particularly where the tagged items are stored in a space significantly larger than the detection range of a stationary or fixed reader equipped with one fixed antenna. However, portable UHF reader and antenna units suffer from several disadvantages. The first involves the cost of human labor associated with the scanning activity. Fixed infrastructure, once paid for, is much cheaper to operate than are manual systems which have ongoing labor costs associated with them. In addition, portable units often lead to ambiguity regarding the precise location of the tags read. For instance, the reader location may be noted by the user, but the location of the tag during a read event may not be known sufficiently well for a given application. That is, the use of portable RFID readers often leads to a spatial resolution certainty of only a few feet, and many applications require knowledge of the location of the tagged items within a spatial resolution of a few inches. Portable RFID readers and mobile reader carts can also be more easily lost or stolen than is the case for fixed reader and antenna systems.

As an alternative to portable UHF RFID readers, a large fixed reader antenna driven with sufficient power to detect a larger number of tagged items may be used. However, such an antenna may be unwieldy, aesthetically displeasing, and the radiated power may surpass allowable legal or regulatory limits. Furthermore, these reader antennas are often located in stores or other locations were space is at a premium and it is expensive and inconvenient to use such large reader antennas. In addition, it should be noted that when a single large antenna is used to survey a large area (e.g., a set of retail shelves, or an entire cabinet, or entire counter, or the like), it is not possible to resolve the location of a tagged item to a particular spot on or small sub-section of the shelf fixture. In some applications it may be desirable to know the location of the tagged item with a spatial resolution of a few inches (e.g., if there are many small items on the retail shelf and it is desired to minimize manual searching and sorting time). In this situation the use of a single large reader antenna is not desirable because it is not generally possible to locate the item with the desired spatial resolution.

Alternatively, a fully automated or mechanized antenna system can be used. U.S. Pat. No. 7,132,945 describes a shelf system which employs a mechanized scanning antenna. This approach makes it possible to survey a relatively large area and also eliminates the need for human labor. However, the introduction of moving parts into a commercial shelf system may prove impractical because of higher system cost, greater installation complexity, and higher maintenance costs, and inconvenience of system downtime, as is often observed with machines which incorporate moving parts. Beam-forming smart antennas can scan the space with a narrow beam and without moving parts. However, as active devices they are usually big and expensive if compared with passive antennas.

To overcome the disadvantages of the approaches described above, fixed arrays of small antennas are utilized in some UHF RFID applications. In this approach numerous reader antennas spanning over a large area are connected to a single reader or group of readers via some sort of switching network, as described for example in U.S. Pat. No. 7,084,769. Smart shelving and other similar applications involving the tracking or inventory auditing of small tagged items in or on RFID-enabled shelves, cabinets, cases, racks, or other fixtures can make use of fixed arrays of small antennas. In tracking tagged stationary items in smart shelving and similar applications, fixed arrays of small antennas offer several advantages over portable readers, systems with a single large fixed antenna, and moving-antenna systems. First, the antennas themselves are small, and thus require relatively little power to survey the space surrounding each antenna. Thus, in systems which query these antennas one at a time, the system itself requires relatively little power (usually much less than 1 watt). By querying each of the small antennas in a large array, the system can thus survey a large area with relatively little power. Also, because the UHF antennas used in the antenna array are generally small and (due to their limited power and range of less than 1-12 inches) survey a small space with a specific known spatial location, it must also be true that the tagged items read by a specified antenna in the array are also located to the same spatial resolution of 1-12 inches. Thus systems using fixed arrays of small antennas can determine the location of tagged items with more precision than portable RFID readers and systems using a small number of relatively large antennas. Also, because each antenna in the array is relatively small, it is much easier to hide the antennas inside of the shelving or other storage fixture, thus improving aesthetics and minimizing damage from external disruptive events (e.g., children's curiosity-driven handling, or malicious activity by people in general). Also, an array of fixed antennas involves no moving parts and thus suffers from none of the disadvantages associated with moving parts, as described above. Also, small antennas like those used in such antenna arrays may be cheaper to replace when a single antenna element fails (relative to the cost of replacing a single large antenna). Also, fixed arrays of antennas do not require special manual labor to execute the scanning of tagged items and, therefore, do not have associated with them the high cost of manual labor associated with portable reader and antenna systems, or with mobile cart approaches.

Almost without exception, implementations of RFID technology involve the direct connection of antennas to an RFID reader, and thus limit the antenna-to-reader ratio to a relatively low number (almost never greater than four). Occasionally, implementations involve the use of multiplexing switches between the reader and the antennas, allowing for a larger number of antennas for each reader. FIG. 1 is a schematic illustrating a typical prior art approach. Individual RFID antennas 100 are connected to a central common RF communications cable 105 using simple switches or relays 110. Over the common cable, the antennas are driven from an RFID reader 120 which generates outgoing and interprets incoming RF signals, referred to herein as "RFID traffic signals" or just "traffic signals". Here RFID traffic signals deals specifically with the signals used to communicate between RFID readers and tags, but in some cases specifically noted in this document "RFID traffic" could also include device control and command signals. Unless otherwise stated, in the descriptions below "RFID traffic" refers to signals to and from antennas for communication with RFID tags. In FIG. 1 the reader is controlled by commands received from a computer 130. To initiate communication with tags (or transponders) 140 within the read range of a particular antenna, the computer 130 selects an antenna and sends the identity of the selected antenna to the switch controller 150, which in turn activates the selected antenna using a control line 115 coupled between the switch controller 150 and the antenna's associated relay 110. The other antennas are deactivated over their respective control lines. The computer 130 then instructs the reader 120 to collect the required information, and the results from the reader 120 are returned to the computer 130 and associated with the active antenna.

Even though the approach shown in FIG. 1 allows the use of many antennas with a single or small number of readers, the technology used to control the multiplexers is crude, requiring manual configuration of the network, and not allowing failover from one reader to another when a reader on the network is disabled. That is, these crude network implementation based on simple multiplexers involve the direct assignment of each antenna to a specific, single reader, and rely upon the health of that single reader for its operation.

The practical implementation of large arrays of small antennas using only a small number of readers depends upon a robust, simple, and economical signal routing approach. The current implementations described herein deal with an RF network control module and method for creation of a much more robust network in which each antenna can be accessed by any one of a collection of two or more readers, depending upon need. In prior art RFID antenna networks, each antenna is assigned to a particular reader and can be accessed by no other reader in the network. If a reader fails or goes off line for any reason, all of the antennas assigned to that reader are essentially dead to the network. Using the prior art, the only way to make it possible to access a particular antenna from more than one reader is to use complex combinations of multiplexers, separate control lines, and external switches. The current embodiments replace all of those components with a single device which allows multiple RFID readers access to the same set of antennas, thus providing the reader failover capability (i.e., a reader failure is detected by the host system managing the network, and is replaced by an active reader such that all antennas in the network remain accessible). Furthermore, a great advantage of the current embodiments over complex combinations of multiplexers, control lines, and external switches is that the current embodiments of the device can be controlled over the same lines that are used to carry the RFID traffic for communication with RFID tags. This greatly minimizes the cabling or wiring requirements for the network, providing lower cost, shorter installation times, easier maintenance, better aesthetics, smaller space requirements, and a number of other advantages. Because the current embodiments makes it practical to introduce redundant pathways in the network, allowing multiple readers to access a given antenna, it allows for network loading balancing. That is, the RFID network host system managing the readers can track the use of readers (load on readers) and use the switching capabilities of the device described in the current invention to spread the load evenly over the readers assigned to a given area of activity in the network.

SUMMARY

The present inventions relate generally to RFID network control devices, and methods of using the same.

In one aspect, there is described a RFID network control device that has a bypass capability between two control ports that are part of the RFID network control device, which allow for RFID traffic signals to enter and exit the RFID network control device using a bypass transmission path, without passing through other internal circuitry of the RFID network control device. Further advantageous aspects, among others, that build on this feature is that redundant RFID readers and/or host devices can be used to monitor and control RFID tags that are associated coupled to RFID ports associated with that particular RFID network control device.

In another aspect, the RFID network control device contains an active RFID reader, also referred to as a smart reader, and can thus generate and decode RFID control signals.

In yet another aspect, a method of configuring and using an RFID network control device that has the bypass transmission path.

These and other aspects and advantages are described further herein.

DETAILED DESCRIPTION OF THE PREFERRED EMBODIMENTS

Preferred embodiments and applications will now be described. Other embodiments may be realized and changes may be made to the disclosed embodiments without departing from the spirit or scope of the inventions described and claimed herein. Although the preferred embodiments disclosed herein have been particularly described as applied to the field of RFID systems, it should be readily apparent that they may be embodied in any technology having the same or similar problems.

In the following description, a reference is made to the accompanying drawings which form a part hereof and which illustrate several embodiments. It is understood that other embodiments may be utilized and structural and operational changes may be made without departing from the scope of the descriptions provided.

In the descriptions of the embodiments provided herein, the terms "coupled", "attached", "connected" and other similar words or phrases are used to describe the electrical unification of two devices, modules, or sub-circuits. This unification can mean the creation of a simple electrical connection through which both AC and DC power or signals can flow, or it can mean the creation of an electrical connection with a capacitor inserted such that DC power is blocked but AC power of sufficiently high frequency can flow. Also, "direct" connection of one device to another means that there is no intervening device between the two connected devices, whereas "indirect" connection means that there are one or more intervening devices between the two connected devices which can, with appropriate configuration, allow flow of signals between the two connected devices.

Figure 1:
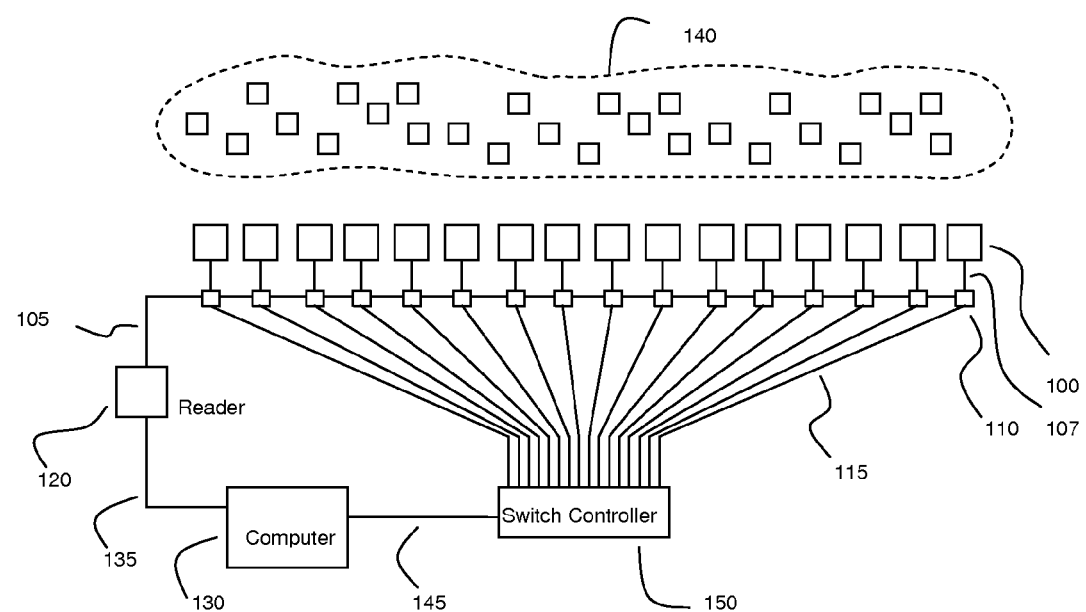
FIG. 1 illustrates a prior art approach to antenna network control using a common RF cable for a large number of RFID antennas, but a separate control line for each antenna activation relay.
Figure 2:
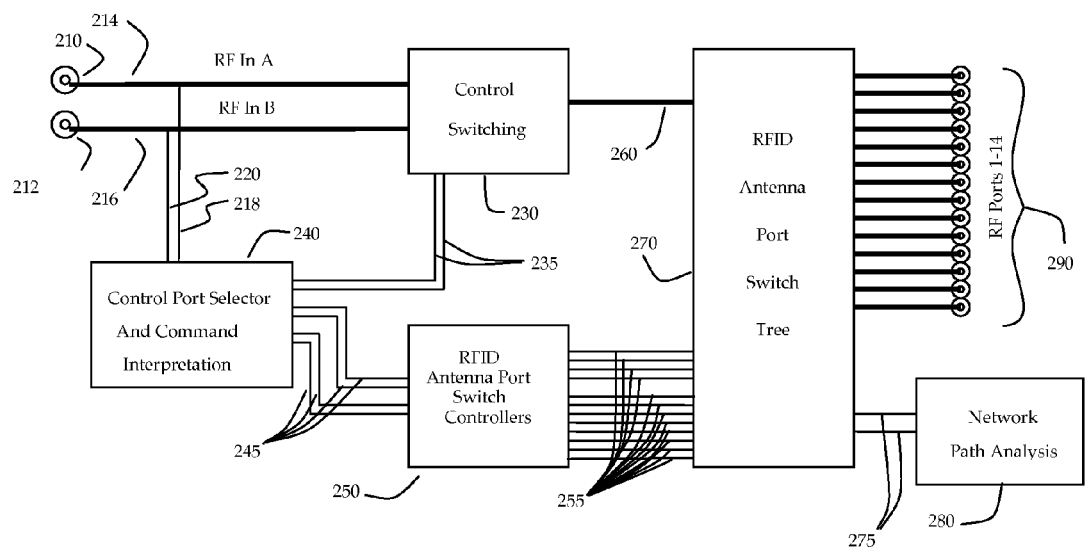
FIG. 2 illustrates an RFID network control device (RNCD), in accordance with a preferred embodiment.

FIG. 2 is a drawing showing the preferred embodiment of the RFID network control device (RNCD), using functional blocks to represent several parts of the device. As shown in the figure, the device has two control ports 210 and 212, and also fourteen RFID antenna ports 290. Each of the RFID antenna ports 290 can be connected to an RFID antenna or other RFID-enabled input-output device (e.g., an RFID signal amplifier, a video display using the RFID protocol for part of its function, an electronic price display device, or a device to convert optical barcode scans into signals appropriate for the network's RFID protocol based communications). When used with a set of low cost RFID antennas built into or attached to the outside of retail shelving, the device shown in FIG. 2 enables an external RFID reader or functionally equivalent host system to access any of the antennas connected to ports 290. Either of the control ports 210 and 212 can be used for either input or output. Also, the presence of two control ports allows a network designer to place a number of these RNCDs in a series and communicate with any one of the devices along the chain from either end of the chain, providing valuable redundancy in the network.

Figure 3:
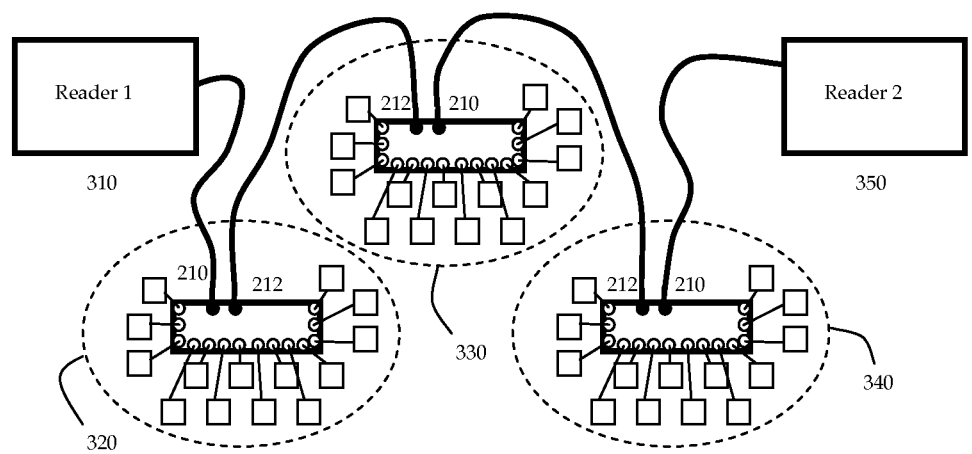
FIG. 3 shows an example of an antenna network enabled by the RFID network control device (RNCD) according to a preferred embodiment.

FIG. 3 shows an example of an RFID antenna network enabled by the RNCD. In this simple network three RNCDs 320, 330, and 340 are placed in series or chain, and two readers 310 and 350 are placed with one at each end of the chain of network control devices. In FIG. 3 each of the network control devices 320, 330, and 340 are shown with fourteen antennas attached to the RFID antenna ports 290 (not labeled in the figure). The control ports 210 and 212 are clearly shown on each of the three network control devices. Note especially that the devices have not been connected in a careful manner so as to preserve the order of connection of these two ports. For example, in the case of device 320, port 210 has been connected to the Reader 1 side of the network, whereas port 212 has been connected to the Reader 2 side of the network. In the case of the other two network control devices 330 and 340, the connection is reversed. That is, for those two devices port 212 is on the Reader 1 side of the network and port 210 is on the Reader 2 side of the network. A fundamental property of the embodiments described herein is that one can connect the devices in any order using any of the control ports, and the network control devices (devices 320, 330, and 340 in FIG. 3) will allow the readers on the network to determine how the control ports have been connected, in a manner described elsewhere in this document. That is, the RFID network control device (RNCD) can support multiple independent readers in a bi-directional manner without respect to the order of the port connections. The internal features of the RNCD which make this bi-directionality possible will be described below.

The simple network shown in FIG. 3 can be used to illustrate another important feature of the embodiments—the bypass feature. For example, note that in order for the first reader, reader 310, to access an antenna connected to RNCD 330, it must be able to send and receive signals along a path which runs through the intervening device—RNCD 320. This is accomplished by providing switching and control internal to the RNCD which provides a short (low-signal-loss) path inside the device, from one control port to the other control port. The means of providing this bypass path will be described in more detail below. Note that in order for a reader to access an antenna port on a given device, it must first identify the intervening devices and give instructions which place these devices in the bypass state. Alternatively, the control units inside the various RNCDs in the network could be configured to act as routers which maintain a knowledge of the other devices on their branch or portion of the network and either disregard (discard) signals or pass along the signals (in the bypass state), depending on what other devices are connected, either directly or indirectly. That is, a novel feature, enabled by the bypass feature and the bi-directionality of the devices according to the preferred embodiments allows the device to act as a selective RFID signal router. This allows network architects to de-centralize the management of the RFID network (i.e., spread the network management functions among a collection of network control devices rather than placing all of that burden on one or a small number of host systems attached to the network).

The network example shown in FIG. 3 shows two readers which are directly coupled to RNCDs. It should be understood, however, that such readers as shown and described here are not typical RFID readers which one can buy on the open market. Rather these readers are multi-functional in that they can generate and decode RFID signals, according to an RFID air interface protocol, for communication with RFID tags (e.g., passive tags on items of interest), and the readers are also capable of generating and decoding commands which communicate with the RNCDs to govern their behavior. Such signals can be carried along the same cables as the RFID traffic, and be encoded as AM, FM, PSK, or any other encoding approach known to those skilled in the art. The control commands could also be incorporated as specific commands in the RFID air-interface protocol. In the situation depicted in FIG. 3 and described above, the RFID reader is really a "smart reader" which is capable of managing a collection of RNCDs, assigning each one tasks as necessary, and configuring each as needed to create a path between itself and a particular antenna attached to a particular RNCD. Such a smart reader would, in turn, be attached to some host system or network running business applications or interfaces to other systems (not shown in FIG. 3).

It is explicitly stated here that the preferred embodiments are not limited to applications involving smart readers as described above. Rather, it is explicitly stated here that the preferred embodiments also include network configurations and applications in which the smart reader is replaced by a system which includes a simple reader (one which only generates and decodes RFID signal traffic to and from tags), a host system (e.g., a computer or microcontroller-based unit) which interfaces with any outside network to which the RFID network may be attached, and another device which manages the RFID network and has the capability to code and decode commands for control of the RNCDs. It should also be noted that the external network interface and RFID network management functions can be combined into a single unit having a single enclosure, such that the smart RFID reader is in the same enclosure as the RFID antenna ports, the two control ports, the switch network, and the control unit of one of the RNCDs. It is also within the scope of the present invention that the smart RFID reader is in close proximity, such as 10 to 100 feet, to the RFID antenna ports, the two control ports, the switch network, and the control unit of one of the RNCDs, such that there is minimal latency between signals transmitted between the smart reader in close proximity to the one RNCD in close proximity We should also note that various data filtering, smoothing, storage, aggregation, and/or analysis functions can be carried out in the smart reader which is controlling the RFID network, or they can be carried out in the host system or the separate device which is also managing the RFID network. For simplicity, this document describes the external command and control of the RNCD as a reader function, but the above discussion should make it clear that the term "reader" is, in reality, used to simplify the description of a set of tasks and functions which may be combined in one reader unit, or spread among several units in a command system.

Figure 4:
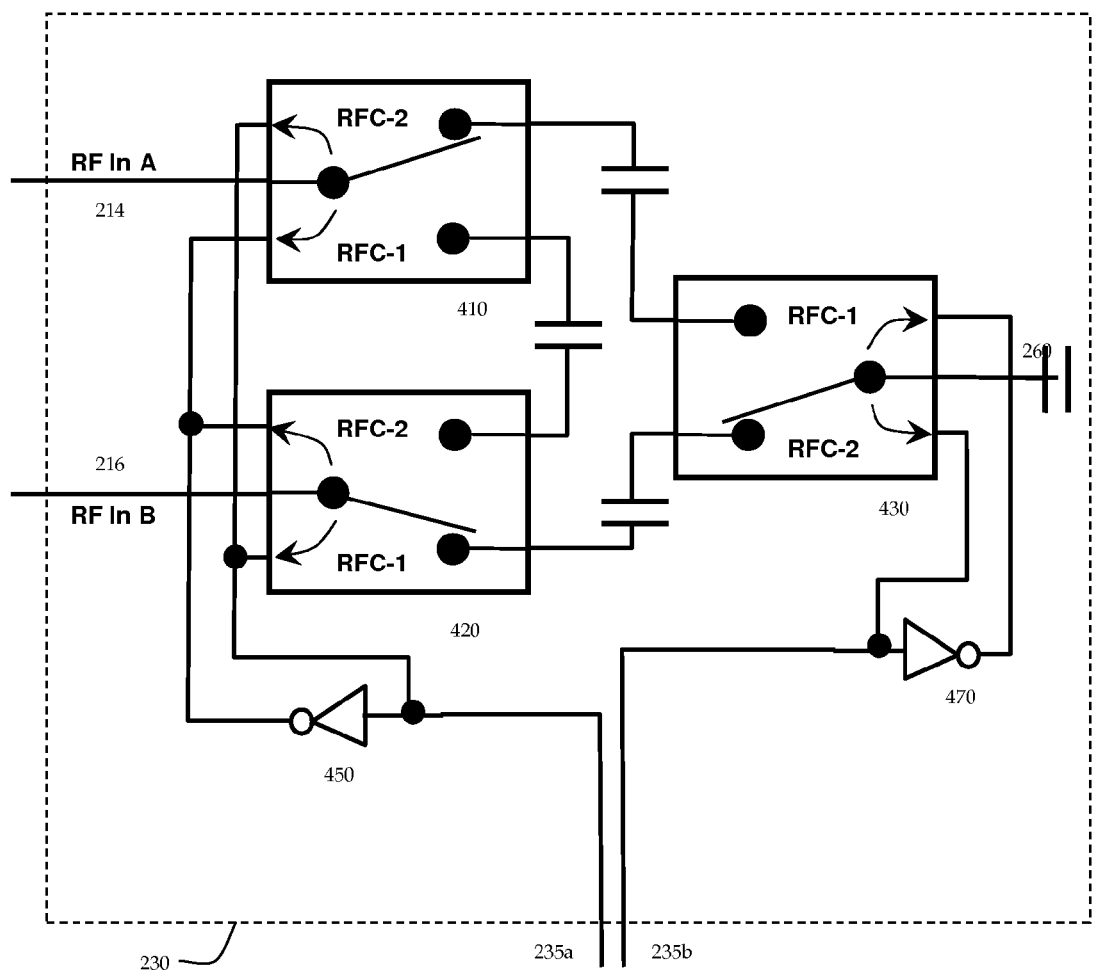
FIG. 4 shows details of the control port switching block (see 230 of FIG. 2), according to a preferred embodiment.

In FIG. 2, RF input/output lines 214 (RF In A) and 216 (RF In B) receive or send RF signals by control ports 210 and 212, respectively, and pass these to and from the control port switching block 230. In the case where RFID traffic signals intended for an RFID antenna coupled to the device are being received through either of the control ports 210 and 212, one of these ports is selected by the control port switching block 230 and then sent out of the control port switching block via line 260 to the RFID antenna port switch tree block 270. The RFID antenna port switch tree block then sends the RF signal from line 260 to one of the RFID antenna ports 290. The function of block 240 is to sample the signals on lines 214 and 216 via lines 218 and 220, respectively, and use commands in those signals to set the state of the control port switching block 230 to one of three states: (1) RF In A active, (2) RF In B active, or (3) Bypass active. These command and control signals may be encoded either as RF signals modulated on the carrier wave, baseband shifts, or any other form of data encoding by amplitude, phase, frequency or other wave changes well understood by those skilled in the art. In the bypass state of the control port switching block 230 a direct communications pathway between the RF In A port and the RF In B port is made and any signal introduced at one port is passed out of the other port. It should be noted, however, that this direct path passes RF but not DC (direct current) or very low frequency AC signals because of the capacitors used to isolate the switches as shown in FIG. 4. The bypass of the DC and low frequency AC signals (e.g., switch control and command signals) through the RNCD is accomplished through lines 218 and 220, as described in more detail below. A key function of block 240 is to pass control commands from lines 214 and/or 216 to the RFID antenna port switch controllers in block 250. The RFID antenna port switch controllers then set the state of the RFID antenna port switch tree 270 via lines 255.

FIG. 4 shows the details of the control port switching block 230, according to a preferred embodiment. The main components of this block, according to the preferred embodiment, include three single-pole double-throw switches 410, 420, and 430, and two inverting gates 450 and 470. Each of the double-throw switches is controlled by two inputs (labeled RFC1 and RFC2 on each switch) such that, in this case, the switch state is set to the side corresponding to the higher of the two voltages (RFC1 or RFC2). The position of the switch depends on the relative voltage levels of RFC1 and RFC2, and in this preferred embodiment these relative voltage levels are controlled by the inverted and non-inverted control lines as shown in FIG. 4. For example, if the voltage on line 235a is high (logical 1), the RFC2 input of switch 410 and the RFC1 input of switch 420 will both be set high, and a pathway from line 214 (via switch 410) and line 216 (via switch 420) will be opened to switch 430. The setting of switch 430 (as determined by the voltage on line 235b) will then determine which of these lines (214 or 216) is open to line 260. In this way the voltage level on control lines 235a and 235b determine which of the two control ports (RF In A or RF In B) have access to the RFID antenna port switch tree 270 and, ultimately, the RFID antenna ports 290. Note that if the voltage on line 235a is low, the settings of switches 410 and 420 will be such that a direct connection is created between line 214 (RF In A) and 216 (RF In B). This is the bypass state of the RNCD. (In this last case the setting of switch 430 is irrelevant.)

Figure 5:
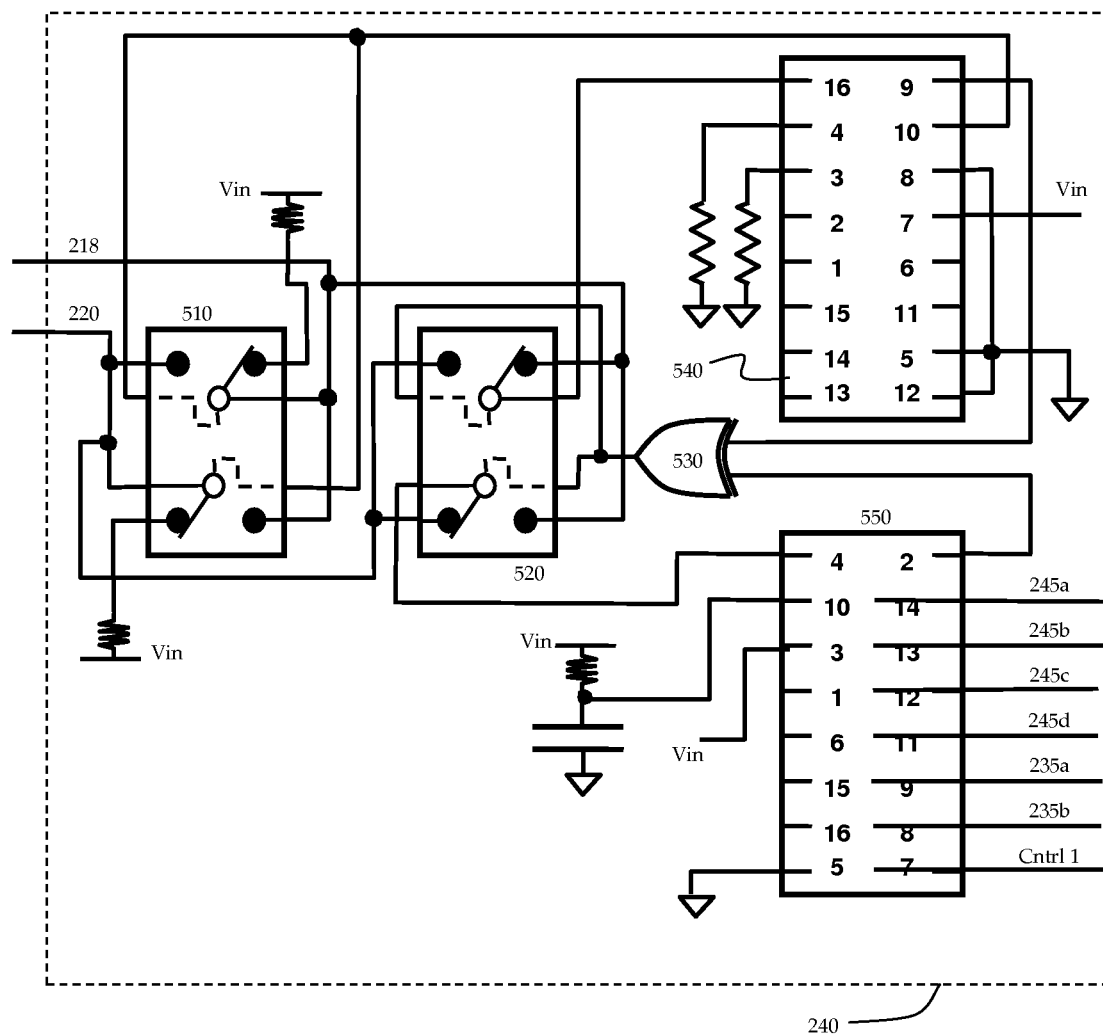
FIG. 5 shows details of the control port selector and command interpretation block (see block 240 of FIG. 2), according to a preferred embodiment.

FIG. 5 shows the details of the control port selector and command interpretation block, 240, of the RFID network control device (RNCD), according to a preferred embodiment. This block of components includes two switches 510 and 520, each of which is a dual SPDT (single-pole double-throw) switch. It also includes two specialized RF command interpreter subcircuits 540 and 550 which are capable of interpreting switch control commands in the signals (encoded as part of the RFID protocol, or a separate RF protocol, as baseband feature changes, or other data encoding methods) received into the block via lines 218 and 220. In this preferred embodiment, the interpreter subcircuits 540 and 550 were implemented with Maxim/Dallas Semiconductor "1-Wire" chips DS28E04S-100+ and DS2408S+, respectively, using baseband pulse amplitude/time signaling techniques. It should be recognized, however, that subcircuits 540 and 550 could be implemented with any combination of components which allows the extraction of switch setting commands from the baseband data signal. Examples of such circuits include those which make use of combinations of directional couplers, analog-digital converters, and microcontrollers which extract a small portion of the signal and convert that to a digital code corresponding to the required switch settings.

Note that interpreter subcircuit 550 is used to control the RFID antenna port switch controllers 250 (see FIG. 2) via control lines 245. Because the RNCD is bidirectional, it must be possible to set the switches in the RFID antenna port switch tree 270 using commands from either of the two control ports of the device. For example, it is an objective to allow the selection of any one of the fourteen antennas on any one of the three network control devices shown in FIG. 3 using commands from either of the two readers 310 or 350. With respect to FIG. 5 this bi-directionality requirement is equivalent to requiring that commands from either line 218 or 220 be routable to command interpreter subcircuit 550 since it is from that interpreter that the RFID antenna port switch controllers receive their input. This requirement is satisfied using the two switches 510 and 520 in combination with the XOR gate 530.

Figure 6:
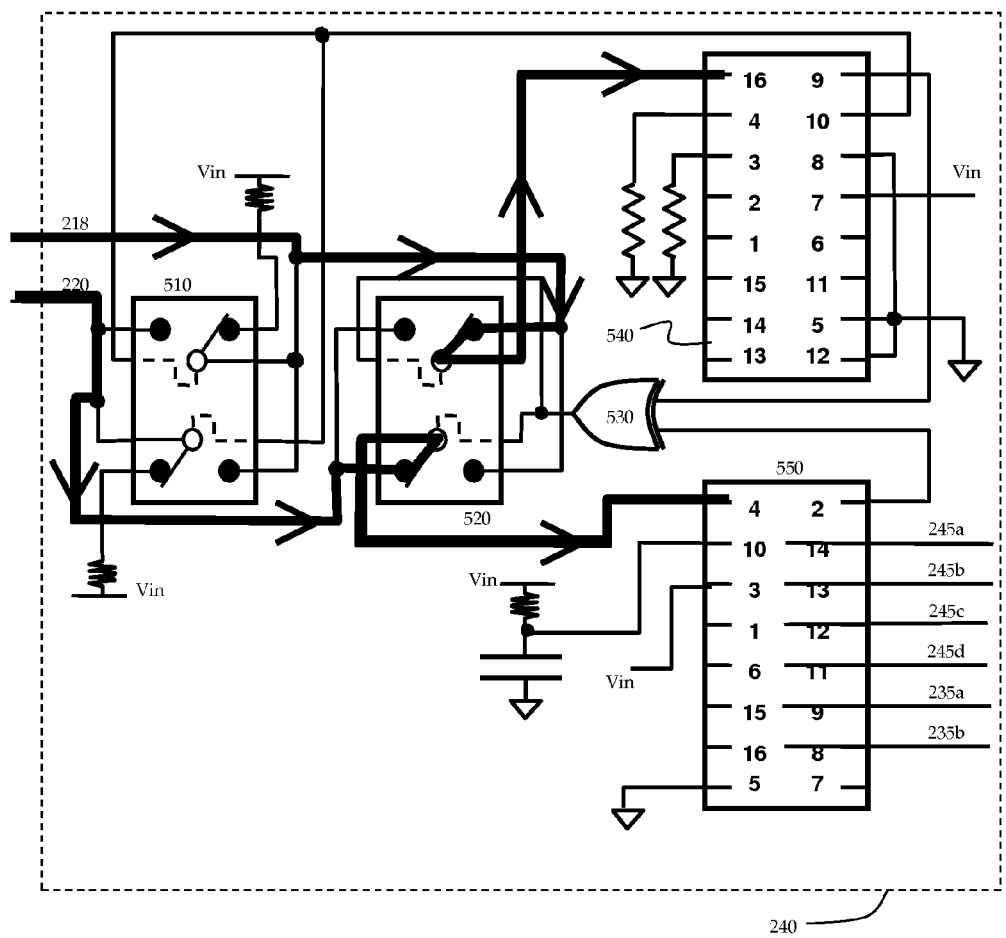
FIG. 6 shows details of the control port selector and command interpretation block (see 240 in FIG. 2), according to a preferred embodiment, showing the switch setting which allows commands from control port RF In B (sampled by line 220) to access the RFID antenna port switch controllers (via lines 245a-245d).
Figure 7:
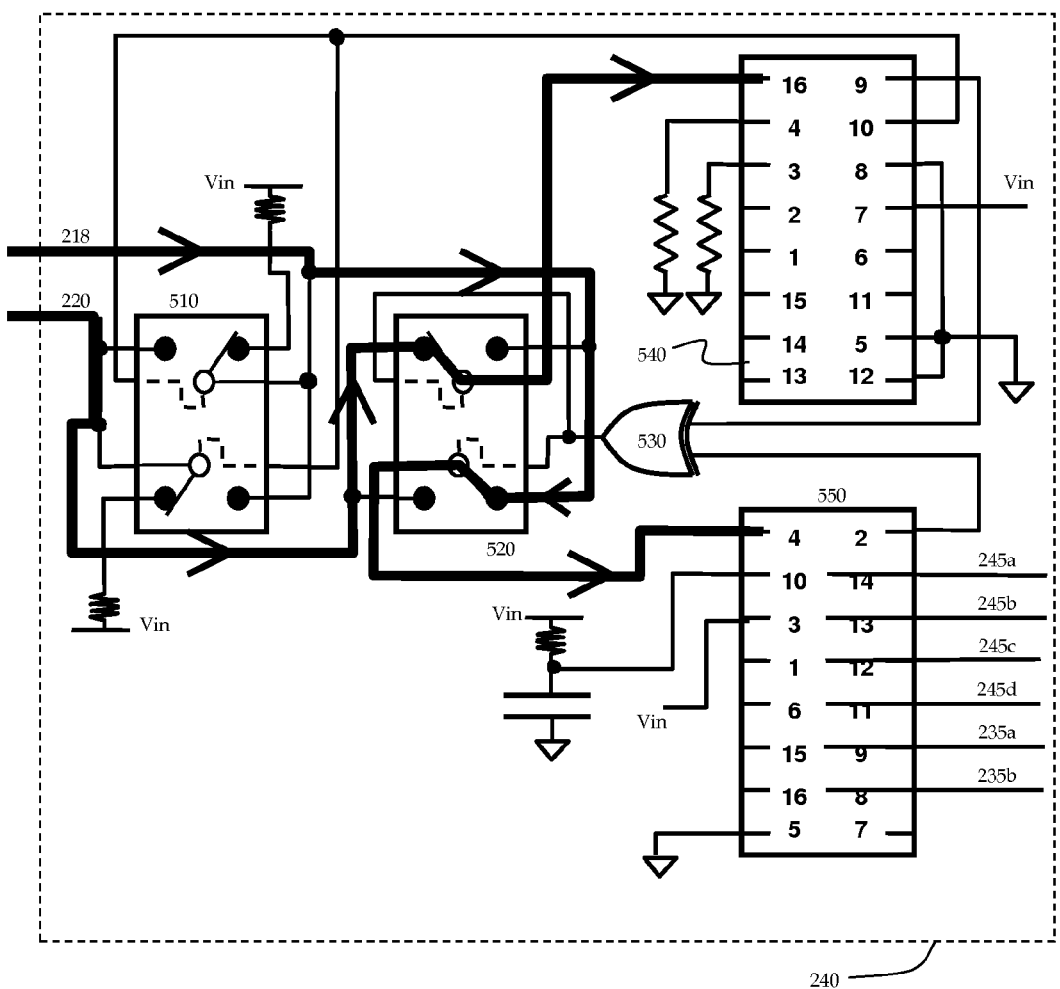
FIG. 7 shows details of the control port selector and command interpretation block (see 240 in FIG. 2), according to a preferred embodiment, showing the switch setting which allows commands from control port RF In A (sampled by line 218) to access the RFID antenna port switch controllers (via lines 245a-245d).

FIG. 6 shows the particular settings for switches 510 and 520 which direct the signal from line 218 (sampling RF In A as shown in FIG. 2) into interpreter subcircuit 540, and also the settings which direct the signal from line 220 (sampling RF In B as shown in FIG. 2) into interpreter subcircuit 550. Note that the two pathways opened by the switch settings are shown by the bold lines in FIG. 6. In this state, it is the commands encoded in the signal from line 220 (RF In B) which are ultimately used to select the active antenna port (i.e., select one of the fourteen RFID antenna ports 290) via the RFID antenna port switch controllers 250. FIG. 7 differs from FIG. 6 in the setting of switch 520. In this case the signal from line 218 (RF In A) is directed to interpreter subcircuit 550 and thus determine the settings in the RFID antenna port switch tree.

During normal operation external network devices (e.g., RFID readers) at either end of a network such as that shown in FIG. 3 (i.e., input from either of the two control ports RF In A and RF In B of a given network control device) will be able to operate switch 520, and thus control which of the two control ports (RF In A or RF In B) are allowed to operate the RFID antenna port switch tree. This provides redundancy in the network which protects against a situation in which a reader on one end of the network becomes defective or inactive. The readers and the computers which control them can detect this reader failure through standard error reporting and network messaging techniques well known to one skilled in the art, and use the features of the RNCDs as described above to read the desired RFID antenna port from the healthy end of the network.

Figure 8:
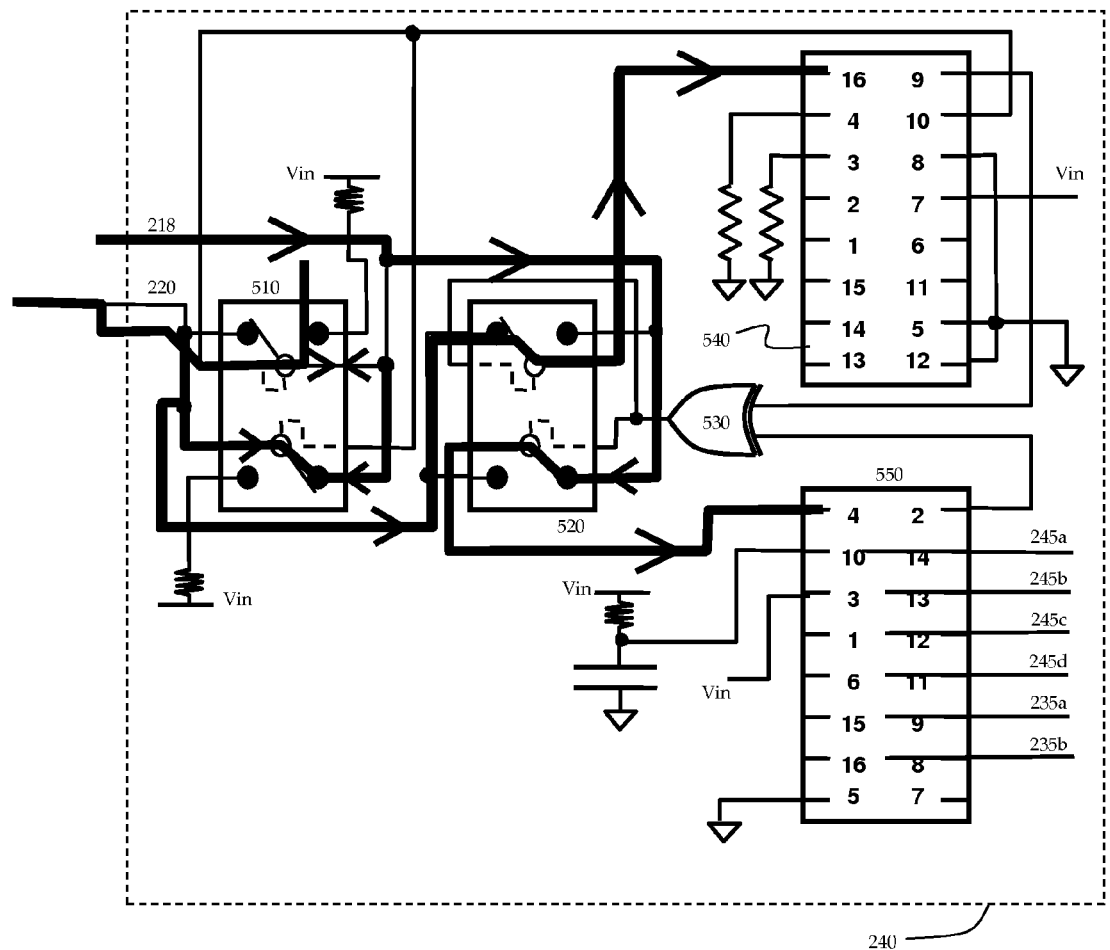
FIG. 8 shows details of the control port selector and command interpretation block (see 240 in FIG. 2), according to a preferred embodiment, showing the switch setting which allows commands from either RF In A (sampled by line 218) or RF In B (sampled by line 220) to access the RFID antenna port switch controllers (via lines 245a-245d).

Note in FIG. 6 and FIG. 7 that the first dual SPDT switch 510 is set such that no signals are running through it. In those two cases it is the second switch 520 that determines which of the two RF signals (i.e., signals from lines 218 and 220) are directed to the two subcircuits 540 and 550. However, as shown in FIG. 8, the first dual SPDT switch 510 can be put in a state which results in a connection to both subcircuits 540 and 550 from either end of the network (line 218 or 220). This provides very significant flexibility to the network operation. A crucial utility afforded by switch 510 when used as shown in FIG. 8 is that it allows control commands entering the RNCD via control port RF In A to exit the device via control port RF In B, and vice versa. As mentioned above, these control commands, if they are in the form of DC or low-frequency AC signals, cannot pass through the bypass route through switches 410 and 420 taken by the higher frequency RF signals as described previously. The DC and low-frequency AC signals, rather, pass through switch 510 when it is configured as shown in FIG. 8.

A careful observation of FIG. 5, FIG. 6, FIG. 7, and FIG. 8 shows that a reader or other RFID-enabled device at either end of the network (via line 218 or 220) can change the state of dual SPDT switch 520 and thus change which end of the network is in control of the RFID antenna port switch controllers 250 and, through those, the state of the RFID antenna port switch tree 290. In other words, a reader at either end of the network which is not in contact with subcircuit 550 (and is therefore in contact with subcircuit 540) can issue a command to subcircuit 540 instructing it to flip its signal to the XOR gate 530 (1 to 0, or else 0 to 1) and thus change the state of dual SPDT 520. That will put the reader into communication with subcircuit 550 and allow it to control, via other appropriate commands to subcircuit 550, the settings of the RFID antenna port switch tree 290.

A final note should be made regarding switches 510 and 520, and their use as shown in FIGS. 6, 7, and 8. When the network is first activated (i.e., when the host system is turned on), the host must have some way of determining the identity, capabilities, and connectivity (port-to-port connections) of the RNCDs in the network. This is done as follows: First the network powers up with switches 510 and 520 configured as shown in FIG. 6. The host sends a search (identification) request to determine the identity of any and all microcontrollers on the network. With switch 510 in each RNCD configured as shown in FIG. 6 (i.e., not allowing command bypass), only one microcontroller will be in a position to hear and respond to that ID request—either controller 540 or 550 of the RNCD closest to the host, depending on the setting of switch 520 in that RNCD, and also depending on the end of the network (i.e., port RF In A or RF In B) that connects that RNCD to the host. Once the microcontroller responds and is authenticated and associated with the network, the host sends that microcontroller a signal to flip the state of switch 520. Then, the other microcontroller of that first RNCD is exposed to the host and is authenticated and associated. Next, the host issues a command to the second microcontroller of the first RNCD to flip the state of switch 510 so that the command signals from the host can reach the second RNCD in the network, at which time its two microcontrollers are authenticated and associated as before. This process is repeated for all RNCDs in the network.

Figure 9:
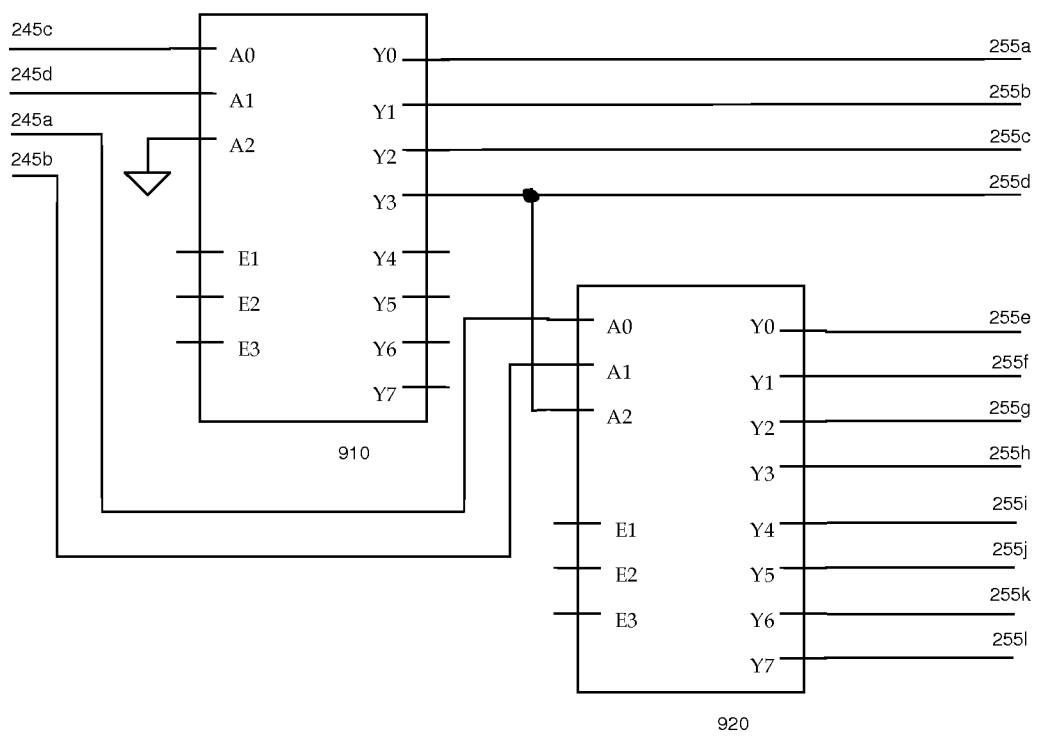
FIG. 9 shows details of the RFID antenna port switch controller block (see 250 in FIG. 2), according to a preferred embodiment.

FIG. 9 shows the details of the RFID antenna port switch controller block 250, according to a preferred embodiment. This part of the RNCD in the preferred embodiment is composed of two conventional high-speed CMOS logic 3-to-8 line decoder modules 910 and 920. An example of such a decoder module available on the open market is the Texas Instruments CD74HC238M chip. Each of the two chips has 3 inputs (A0, A1, and A2) and 8 outputs (Y0 through Y7). Subcircuit 550 of the input switches control and command interpretation block 240 sets the inputs of the two decoder modules 910 and 920.

Figure 10:
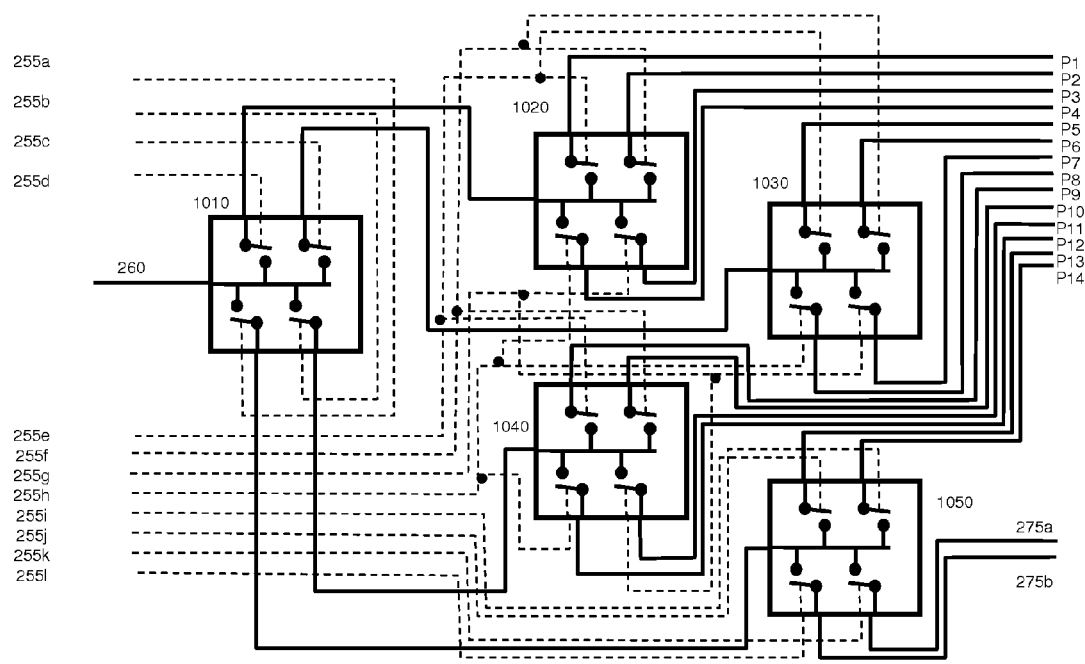
FIG. 10 shows details of the RFID antenna port switch tree block (see 270 in FIG. 2), according to a preferred embodiment.

FIG. 10 shows the details of the RFID antenna port switch tree block 270 according to a preferred embodiment. The main signal line 260 coming from the control port switching block 230 enters the first layer switch 1010 of the RFID antenna port switch tree. The setting of this first layer switch is controlled by the four control lines 255a, 255b, 255c, and 255d coming from module 910 of the RFID antenna port switch control block 250 (see FIG. 9). The truth table of the decoder module 910 is such that only one of the lines 255a, 255b, 255c, and 255d is high (logic 1) at any instant in time. The choice of the high line, via its action on switch 1010, determines which of the second layer switches (1020, 1030, 1040, and 1050 in FIG. 10) will receive the RF signal from line 260 (see FIG. 10). Note that in the preferred embodiment the first four outputs Y0, Y1, Y2, and Y3 from module 920 (via lines 255e, 255f, 255g, and 255h) are used to control only three of the four second-layer switches (1020, 1030, and 1040 in FIG. 10). The last switch in the second layer, switch 1050, has its own dedicated control lines coming from decoder module 920 (lines 255i, 255j, 255k, and 255l). In a conventional switch tree, in the simplest implementation, all four switches of the second layer would be controlled by the same four lines (e.g., 255e, 255f, 255g, and 255h). However, in this case the last switch of the second layer (switch 1050) has been given its own control lines so that, when the network control device is in a bypass mode (i.e., none of the antenna ports 290 are being directly accessed), the first three switches of the second layer (switches 1020, 1030, and 1040) can be turned off. This results in significant power savings in a network which has a large number of such RNCDs, most of which are in bypass mode at any given time.

Figure 11:
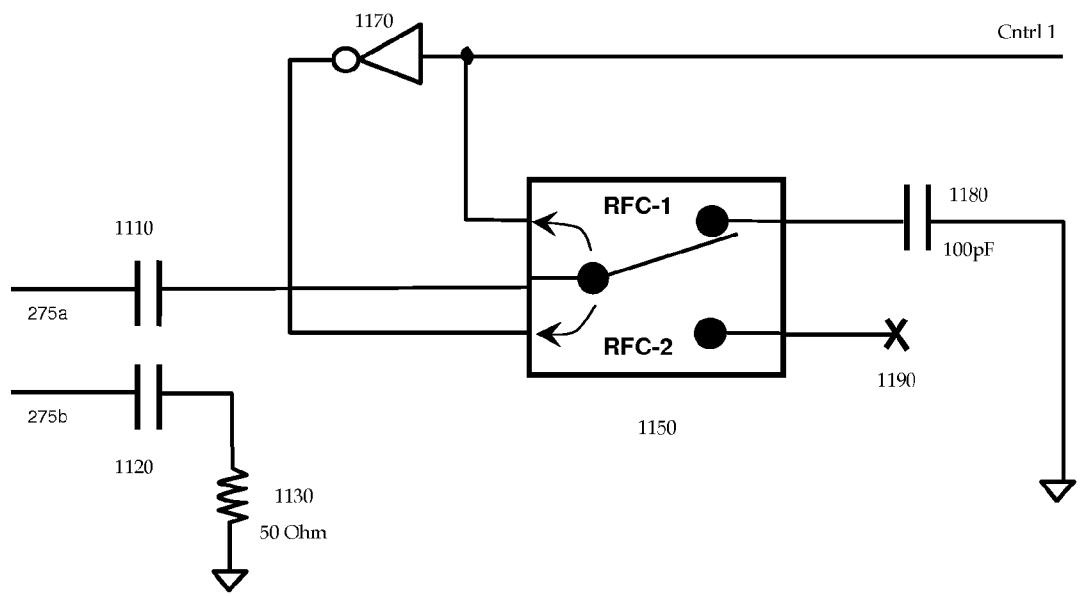
FIG. 11 shows the details of the network path analysis block 280, according to a preferred embodiment.

FIG. 11 shows the subcircuit used to analyze RF path and signal loss in a variable and unpredictable network environment. In the implementation of a number of RNCD's in the control of a large RFID antenna network, it is useful and convenient to use the RNCD's for RFID path integrity analysis. For example, if a physical line disruption or break occurs somewhere in the network, the circuit of FIG. 11 can be used to indicate to the host system that the RNCD is on line and operating correctly. Input lines 275a and 275b come from the RFID antenna port switch tree 270 (see FIG. 10). When line 275b is active, the RNCD termination observed by VSWR-measuring components located in the host system or elsewhere in the network is a purely resistive 50-ohm load. On the other hand, when line 275a is activated by the antenna port switch tree 270, then either an open circuit or a capacitive short circuit is observed (both of which have purely reactive impedance). The latter choice (open circuit versus short circuit) is determined by control signal cntrl 1 acting on switch 1150. In this preferred embodiment, control signal cntrl 1 originates in control port selector and command interpretation block 240 (see FIG. 5). By accessing lines 275a and 275b on all of the RNCDs in the network and making VSWR measurements on the ideal reactive (open and short circuits) and resistive (50 ohm) loads, the host system can determine the health of the RF cables and connections between the RFID reader or host system and each RNCD in the network.

The RFID network control device as described in the preferred embodiments enables the creation of single-cable RFID antenna networks of widely varying structure which have the desirable properties of reader failover, load balancing over the collection of readers in the network, decreased complexity of network design and installation, and other desirable characteristics of a robust plug-and-play RFID antenna network. The embodiments are of particular use in RFID applications with large numbers of small, low-power antennas, such as retail smart shelving applications.

The embodiments described in this specification and depicted in its various figures make use of switches of various types, including single-pole double-throw and single-pole quadruple-throw switches. It should be recognized by the reader that there are many ways of designing switching trees and other line switching sub-circuits, and it should be understood that the current inventions are not reliant on any one choice of these alternatives. This specification clearly describes approaches to designing a bi-directional, multiple control port, bypass-equipped RFID network control device which allows multiple readers or host computers directly or indirectly coupled to its control ports to control the bypass switch behavior and the behavior of the switch tree which directs signals from a selected control port to a particular RFID antenna port of the device. These functions and features of the current inventions do not rely upon the details of switching components or their layout, since there are many ways of connecting and controlling the internal switches to achieve similar ends. Similarly, the current inventions do not rely upon one approach to internal control. For example, a single controller could be used to control all of the switches (assuming it has sufficient numbers of inputs and outputs), or multiple linked controllers can be used inside the RNCD to interpret commands and set switches. The current inventions are not limited to any one approach to this internal control.

Although specific circuitry, components, modules, or dimensions of the same may be disclosed herein in connection with exemplary embodiments of the invention, it should be readily apparent that any other structural or functionally equivalent circuit(s), component(s), module(s), or dimension(s) may be utilized in implementing the various embodiments of the invention. It is to be understood therefore that the inventions are not limited to the particular embodiments disclosed (or apparent from the disclosure) herein.

Aspects of the present inventions include an RFID network control device comprising: a plurality of RFID antenna ports adapted to couple with RFID antennas and convey RFID traffic signals between said RFID network control device and one or more RFID tags in the vicinity of said antennas; at least two control ports, each of said control ports adapted to couple directly or indirectly to an RFID reader, and each of said control ports adapted to convey both RFID traffic signals for conveyance to said antennas, and also command signals for control of the operation of said RFID network control device, or other devices connected to said RFID network control device through its ports; a set of switches capable of connecting any one of said control ports to any one of said antenna ports of said RFID network control device; and a control unit or units such that, by appropriate command from any RFID reader attached directly or indirectly to any control port of said RFID network control device, said set of switches may be configured to direct RFID traffic from said RFID reader to any antenna port of said RFID network control device.

The RFID network control device may further comprise a bypass pathway created by a switch or set of switches which can be configured to directly couple a pair of control ports of the at least two control ports such that RFID traffic signals and command signals may pass from one control port of said pair to the other control port of said pair.

In addition, the control unit or units of said device can be instructed, configured, and controlled by commands from an appropriate reader coupled directly or indirectly to any control port of said device. The control unit or units of said device can be instructed, configured, and controlled by commands from a host system, computer, or external controller coupled directly or indirectly to any control port of said device, and wherein the RFID traffic signals used to communicate with RFID tags in the vicinity of antennas coupled to said device are generated by an RFID reader either located inside or coupled to said host system, computer, or external controller.

The control unit or units of said device can be instructed, configured, and controlled by commands included as part of the RFID protocol signals generated and decoded by a reader coupled directly or indirectly to a control port of said device.

In a further aspect the device can generate signals which can communicate with a second device coupled directly or indirectly to a control port of said device and thereby indicate to the second device the identity, configuration, settings, capabilities, and other characteristics of either itself or any other devices coupled directly or indirectly to control ports or RFID antenna ports of said device. Such a device can generate signals to instruct external devices coupled directly or indirectly to the control ports of said device regarding the identity of the control ports to which those external devices are coupled, and to subsequently respond to commands received from one of those external devices instructing the control unit or units to reconfigure a switch or set of switches in such a way that the identity of the control ports is effectively altered in a way which makes network management more convenient for one or more of the external devices.

In another aspect, the host system, computer, or external controller has capabilities of RFID data filtering, smoothing, storage, aggregation, and/or analysis. Also, the host system, computer, or external controller can have capabilities of managing the RFID network control devices and other devices coupled to it, including the identification, capability assessment, connectivity and configuration state determination, active operating mode determination, duty cycle and load assessment, and assessment of other states, configurations, and capabilities necessary to initiate and maintain effective operation of the network.

In a further aspect, the RFID antenna network can comprising two or more RFID network control devices as described above, one or more RFID antennas coupled to one or more of the antenna ports of one or more of said RFID network control devices; two or more host systems, computers, or external controllers, each of which is coupled directly or indirectly to a control port of one or more of said RFID network control devices; two or more RFID readers, each of which is coupled to one of said host systems, computers, or external controllers; and cabling which couples all of the RFID network controllers into a network which allows any of said host systems, computers, or external controllers to create a communications pathway between any of said readers and any of said RFID antennas.

The RFID network control devices mentioned above can form a linear chain or daisy chain, and in which one of said host systems, computers, or external controllers is coupled to an RFID network control device on one end of said chain, and a second of said host systems, computers, or external controllers is coupled to an RFID network control device on the other end of said chain. They can also form a branching structure in which two or more of said RFID network control devices form a linear chain, and the RFID network control device on one end of said chain is coupled to two or more additional RFID network control devices. Still further, the RFID network control devices can form a loop or ring structure.

Also, the RFID network control devices and the RFID antennas coupled to said RFID network control devices can be incorporated into the structure of a storage or display fixture such as a shelf, cabinet, counter, bin set, closet, or other fixture.

Although the present invention has been particularly described with reference to embodiments thereof, it should be readily apparent to those of ordinary skill in the art that various changes, modifications and substitutes are intended within the form and details thereof, without departing from the spirit and scope of the inventions. Accordingly, it will be appreciated that in numerous instances some features of the inventions will be employed without a corresponding use of other features. Further, those skilled in the art will understand that variations can be made in the number and arrangement of components illustrated in the above figures. It is intended that the scope of the appended claims include such changes and modifications.

What is claimed is:

1. A radio frequency identification (RFID) network control device comprising:
   a plurality of RFID antenna ports adapted to direct RFID traffic signals to and from one or more RFID antennas;
   at least two control ports, each of said at least two control ports configurable to be switched to a configuration that allows for bidirectional communication of at least some of the RFID traffic signals through the respective control port, to be switched to a command configuration that allows for bidirectional communication of RFID command signals through the respective control port, and to be switched to a bypass configuration that that allows direct transmission of certain ones of the RFID traffic signals input to one of the at least two control ports to another one of the at least two control ports for output of the certain ones of the RFID traffic signals from the another one of the at least two control ports, thereby providing for a bypass transmission path through the RFID network control device, wherein the RFID command signals include the radio frequency carrier signal having RFID command information modulated thereon, the RFID command information being different from the RFID traffic information;
   a switch network configurable to connect any one of said at least two control ports to any one of said plurality of RFID antenna ports of said RFID network control device; the switch network comprising a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple at least two of said ports to provide an electrically connected communication path for traffic signals between a pair of said ports; and
   a control unit adapted to receive the RFID command signals and to configure and control any of the at least two control ports and the switch network based upon the RFID command information.

2. The RFID network control device of claim 1, further including an RFID reader coupled to one of the at least two control ports that is configured to generate at least some of the RFID command signals.

3. The RFID network control device of claim 2, the RFID reader configured to generate at least some of the RFID traffic signals.

4. The RFID network control device of claim 3, the RFID reader adapted to generate and decode the RFID command signals.

5. The RFID network control device of claim 4, the RFID reader disposed in a same enclosure as the plurality of RFID antenna ports, the at least two control ports, the switch network, and the control unit.

6. The RFID network control device of claim 2, the RFID reader to generate signals to instruct an external device associated with one of the RFID tags regarding identity information for the control port to which the external device is coupled, and to respond to particular RFID command signals received from the external device instructing the control unit to reconfigure the switch network, thereby reconfiguring the switch network based upon the particular RFID command signals.

7. The RFID network control device of claim 1, further comprising:
   a plurality of the RFID network control devices as recited in claim 1; and
   a wired connection between one of the at least two control ports for each of the plurality of the RFID network control devices and one of the at least two control ports of another one of the plurality of the RFID network control devices, to create an RFID network.

8. The RFID network control device of claim 7, each of said plurality of RFID network control devices connected to form one of a linear chain and a daisy chain.

9. The RFID network control device of claim 7, each of the plurality of RFID network control devices connected to form a branching structure in which two or more of said plurality of RFID network control devices form a linear chain, and a particular one of the plurality of RFID network control device on one end of the linear chain is coupled to two or more additional RFID network control devices.

10. The RFID network of claim 7, each of the plurality of RFID network control devices connected to form a loop structure.

11. A control arrangement for a radio frequency identification (RFID) network control device comprising:
   at least two control ports, each of said at least two control ports configurable to be switched to a configuration that allows for bidirectional communication of RFID traffic signals through the respective control port, to be switched to a command configuration that allows for bidirectional communication of RFID command signals through the respective control port, and to be switched to a bypass configuration that that allows direct transmission of certain ones of the RFID traffic signals input to one of the at least two control ports to another one of the at least two control ports for output of the certain ones of the RFID traffic signals from the another one of the at least two control ports, thereby providing for a bypass transmission path through the RFID network control device, wherein the RFID command signals include the radio frequency carrier signal having RFID command information modulated thereon, the RFID command information being different from the RFID traffic information;
   a plurality of RFID antenna ports adapted to direct the RFID traffic signals to and from one or more RFID antennas; and
   a switch network having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple at least two of said ports to provide an electrically connected communication path for traffic signals between a pair of said ports.

12. The control arrangement of claim 11, further comprising a switch network configurable to connect any one of said at least two control ports to any one of said plurality of RFID antenna ports of said RFID network control device.

13. The control arrangement of claim 12, further comprising a control unit adapted to receive the RFID command signals and to configure and control any of the at least two control ports and the switch network based upon the RFID command information.

14. A radio frequency identification (RFID) control arrangement, comprising:
- a plurality of RFID readers;
- an RFID network control device for coupling to RFID antennas and the plurality of RFID readers for allowing bidirectional communications between RFID tags disposed in a vicinity of the RFID antennas and the plurality of RFID readers, the network control device comprising:
- a plurality of RFID antenna ports each adapted to direct RFID traffic signals to and from one or more of the RFID antennas, wherein the RFID traffic signals include a radio frequency carrier signal having RFID traffic information modulated thereon;
- at least two switchable, configurable and bidirectional control ports, each of said at least two control ports configurable to be switched to a configuration that allows for bidirectional communication of at least some of the RFID traffic signals through the respective control port, to be switched to a command configuration that allows for bidirectional communication of RFID command signals through the respective control port, and to be switched to a bypass configuration that that allows direct transmission of certain ones of the RFID traffic signals input to one of the at least two control ports to another one of the at least two control ports for output of the certain ones of the RFID traffic signals from the another one of the at least two control ports, thereby providing for a bypass transmission path through the RFID network control device, and
- a switch network having a plurality of inverters, switches and conductive paths, the plurality of inverters, switches, and conductive paths arranged in a cascading configuration including at least two interconnected layers of the switches, each switch of the plurality of switches coupled to an inverter of the plurality of inverters, and each conductive path of the plurality of conductive paths assigned and coupled to a switch of said plurality of switches, each switch adapted to selectively couple at least two of said ports to provide an electrically connected communication path for traffic signals between a pair of said ports,
- wherein the RFID command signals include the radio frequency carrier signal having RFID command information modulated thereon, the RFID command information being different from the RFID traffic information;
- wherein first and second RFID readers of the plurality of RFID readers are coupled to the RFID network device via one of the at least two control ports, and
- wherein the RFID network control device is configurable by the first and second RFID readers to allow the first and second RFID readers to generate and receive the RFID traffic signals and the RFID control signals.

15. The radio frequency identification (RFID) control arrangement of claim 14, the RFID network control device for tracking use of the plurality of RFID readers and for switching the plurality of RFID readers to spread a load evenly over the plurality of RFID readers.

16. The radio frequency identification (RFID) control arrangement of claim 15, at least one of the plurality of RFID readers being a smart reader configured to manage the RFID network control device.

17. The radio frequency identification (RFID) control arrangement of claim 16, the smart reader for configuring the RFID network control device to create a communication path between the smart reader and an antenna associated with the RFID network control device.

18. The radio frequency identification (RFID) control arrangement of claim 14, comprising a plurality of said RFID network control devices, each of said plurality of RFID network control devices connected to form one of a linear chain, a daisy chain and a loop structure.

19. The RFID network control device of claim 18, each of the plurality of RFID network control devices connected to form a branching structure in which two or more of said plurality of RFID network control devices form a linear chain, and a particular one of the plurality of RFID network control device on one end of the linear chain is coupled to two or more additional RFID network control devices.

* * * * *